US012554691B1

(12) United States Patent
Singh et al.

(10) Patent No.: US 12,554,691 B1
(45) Date of Patent: *Feb. 17, 2026

(54) ASSISTED DATABASE ANOMALY MITIGATION

(71) Applicant: Amazon Technologies, Inc., Seattle, WA (US)

(72) Inventors: Vikramank Yogendra Singh, San Francisco, CA (US); Zhao Song, San Jose, CA (US); Balakrishnan Narayanaswamy, San Jose, CA (US); Maxym Kharchenko, Issaquah, WA (US); Jeremiah C Wilton, Seattle, WA (US); Vijay Gopal Joshi, Kenmore, WA (US); Joshua Tobey Oberwetter, Seattle, WA (US); Kyle Henderson Hailey, Nevada City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,183

(22) Filed: Sep. 20, 2024

Related U.S. Application Data

(63) Continuation of application No. 17/491,384, filed on Sep. 30, 2021, now Pat. No. 12,130,788.

(51) Int. Cl.
| | | |
|---|---|---|
| *G06F 7/00* | (2006.01) | |
| *G06F 9/48* | (2006.01) | |
| *G06F 9/50* | (2006.01) | |
| *G06F 16/21* | (2019.01) | |
| *G06F 16/2455* | (2019.01) | |
| *G06N 20/00* | (2019.01) | |

(52) U.S. Cl.
CPC ............ *G06F 16/217* (2019.01); *G06F 9/485* (2013.01); *G06F 9/5038* (2013.01); *G06F 16/24553* (2019.01); *G06N 20/00* (2019.01)

(58) Field of Classification Search
CPC ............ G06F 16/217; G06F 16/24553; G06F 16/24578; G06F 16/24; G06F 16/13; G06F 16/2272; G06F 16/2425; G06F 16/2428; G06F 16/2455; G06F 16/248; G06F 16/14; G06F 16/38; G06F 9/485; G06F 9/5038; G06F 3/04842; G06F 3/0482; G06F 3/04883; G06N 20/00; G06N 5/04

See application file for complete search history.

(56) References Cited

U.S. PATENT DOCUMENTS

| | | | | |
|---|---|---|---|---|
| 12,130,788 B1 * | 10/2024 | Singh | ................ | G06F 16/24553 |
| 2009/0077013 A1 * | 3/2009 | Hu | .................... | G06F 16/24534 |
| 2017/0124220 A1 * | 5/2017 | Krueger | ............. | G06F 16/2425 |
| 2020/0134071 A1 * | 4/2020 | Sun | ...................... | G06F 16/2425 |
| 2021/0334280 A1 * | 10/2021 | Medvedev | ............ | G06F 18/214 |
| 2022/0121560 A1 * | 4/2022 | Tetreault | ............. | G06F 11/3688 |

* cited by examiner

*Primary Examiner* — Mohammad A Sana
(74) *Attorney, Agent, or Firm* — Davis Wright Tremaine LLP

(57) ABSTRACT

An anomalous period of operation of a database management system is detected by analyzing a time series of data points indicating the number of database queries pending processing by the system. Conditions associated with execution of the pending database queries are recorded and analyzed to identify conditions correlated with the anomalous period of operation. A recommendation for tuning the database is generated based on analysis of the conditions.

20 Claims, 8 Drawing Sheets

ASSISTED DATABASE ANOMALY MITIGATION

CROSS REFERENCE TO RELATED APPLICATIONS

This application is a continuation of U.S. patent application Ser. No. 17/491,384, filed Sep. 30, 2021, entitled "ASSISTED DATABASE ANOMALY MITIGATION," the disclosure of which is incorporated herein by reference in its entirety.

BACKGROUND

Hosted database management systems provide their users with a convenient mechanism for obtaining access to the capabilities of a database management system without the overhead of managing the hardware and software necessary for such systems. However, hosted database systems may still require their users to have considerable experience in database design and optimization. The ability of hosted database systems to assist users in performing such tasks could be improved.

BRIEF DESCRIPTION OF THE DRAWINGS

Various techniques will be described with reference to the drawings, in which.

DETAILED DESCRIPTION

In an example, system for assisting in the mitigation of a database anomaly automatically identifies the occurrence of an anomaly and generates recommendations for tuning performance of the database in order to mitigate the anomaly. The database anomaly can include periods in which the performance of the database is insufficient with respect to the demands normally placed upon in. In the example, the system generates recommendations to tune performance of the database system, based on evaluation of conditions observed during the period of anomalous operation.

In a further aspect of the example, the system periodically determines how many database queries are pending processing by the system and uses this information to generate a time series. The system then detects the occurrence of an anomaly by analyzing the time series data using a machine learning model. When the anomaly is detected, the system leverages additional data, related to wait states and other conditions encountered during processing of database queries, to identify computing resources on which evaluation of the queries is dependent.

In a further aspect of the example, the system generates recommendations for tuning performance of the database system based on analysis of conditions observed during processing queries in an anomalous period, such as wait states or query frequency. The system may additionally improve the recommendations by evaluating a series of hypotheses concerning the observed conditions and database commands. A hypothesis may be linked to a specific recommendation that can be provided to the owner of the database management system when the hypothesis is evaluated as true.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
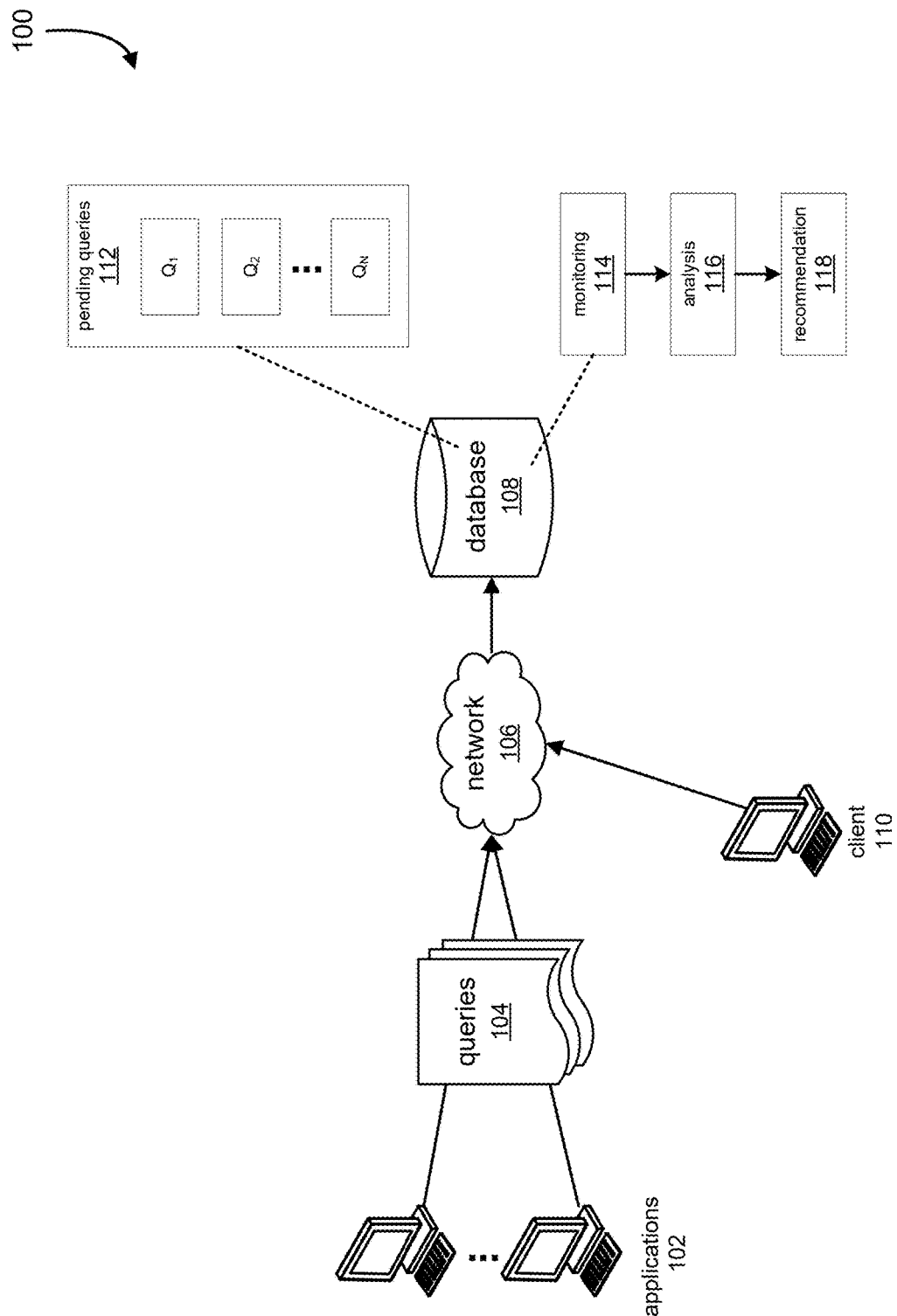
FIG. 1 illustrates an example database system in which anomalous database load conditions are detected and recommendations for mitigation generated, in accordance with at least one embodiment.

FIG. 1 illustrates an example database system in which anomalous database load conditions are detected and recommendations for mitigation generated, in accordance with at least one embodiment. In the depicted example 100, one or more applications 102 utilize a database 108 by sending queries 104, over a network 106, to the database 108.

The applications 102 may comprise any of a variety of devices or software programs which interact with the database 108 to utilize the database's capabilities for storing or retrieving data. There may be a number of applications 102 operating at any one time, and the demands they place on the database 108 may vary. Ideally, the time spent by an application waiting for a response from the database 108 is minimal or at least consistent. However, the demands placed upon the database 108 may vary, over time, in unpredictable ways. Some periodic variation in demand, such as demand peaks at certain times of day, may be considered normal. These variations may sometimes be described as seasonal variations. In some cases, the demands placed upon the database 108 for other reasons, including programming errors, database administration issues, distributed denial of service attacks, and so on. It can be difficult for the owner of a database to determine that this anomalous behavior is occurring, and difficult for the owner to identify a root cause of the anomalous behavior. However, using various techniques described herein, the example system 100 includes capabilities for automatically detecting these anomalies and generating suggestions for mitigating the anomalous behavior.

The database 108 can comprise any of a variety of systems for storing and retrieving data. In at least one embodiment, the database 108 is a hosted relational database system managed by a computing service provider. The service provider may control various aspects of the database's operations, potentially including but not necessarily limited to providing scalable storage and compute resources, backup and restoration services, failover, and performance tuning.

In the example system 100, a client 110 is associated with the owner of the database 108. Here, the owner corresponds to the entity on whose behalf the database 108 is operated. For example, a computing service provider may host database 108 on behalf of the owner, and provide client 110 with access to a console, API, or other means of performing basic administrative tasks related to the operation of database 108. Note, however, that the computing service provider may perform many of the substantive administrative tasks related to the database's operation, above and beyond the basic administrative tasks performed via the client 102. The client 110 may comprise any computing device and associated software for accessing a console, API, or other means of interacting with the computing service provider to perform basic administrative tasks.

As noted above, one challenge related to the detection of anomalous behavior in a database system is determining when such behavior is occurring. In at least one embodiment, anomalous conditions are detected by analyzing pending queries 112. As used herein, a pending query refers to a query or other database command that has been received by a database but whose processing has not yet been completed. A pending query may also be referred to as an active query or active session. Note, however, that although such queries may be described as pending or active, they may spend time in a wait state during their processing. A wait state refers to the query waiting for event or completion of an event, and may sometimes be referred to as a wait condition. Examples may include, but are not limited to, the availability of a computing resource, the completion of a processing step by a computing resource, and so on. Examples may include, but are not limited to, sequential or parallel file reads, sequential or parallel writes, index scans, compute tasks, lock acquisitions, and so on. More generally, a wait state may be said to represent a condition where a database system is waiting, during processing of a database query, for a computing resource to complete a task. A task may include any of a variety of operations that might be performed by a computing resource, and may also include waiting for the computing resource to become available to complete an operation.

A database command, query language command, refers to a textual or programming interface-based representation of a database operation. In various embodiments, a database command is represented as a structured query language ("SQL") statement, although any of a variety of languages or application programming interfaces may be used. A database command may contain various elements that, when evaluated by a database, cause the database to utilize various computing resources, such as storage devices, memory, network bandwidth, and central processing unit ("CPU") capabilities. The elements of a database command may therefore be said to rely on, or wait on, certain of these various computing resources. When many such database commands are executing, there may be competition between the various commands that results in the database entering an anomalous state or operating condition.

To detect such anomalous conditions, the system 100 includes a monitoring component 114 that monitors the number of pending queries 112 over time. In at least one embodiment, the system 100 generates a time series that indicates the number of pending queries 112 over a given time period. The time series is then analyzed by a machine learning model that has been trained to identify anomalous database load conditions using the time series as input. The machine learning model may be any of a variety of machine learning and artificial intelligence models, potentially including but not necessarily limited to convolutional neural networks, recurrent neural networks, autoencoders, and long/short term memory networks. In at least one embodiment, time series analysis is offloaded to a service which provides hosted capabilities for training, storing, and using a machine learning model.

In at least one embodiment, an analysis component 116 responds to the detection of the anomalous load condition by analyzing wait states associated with the pending queries 112 over time. The system 100 may, for example, perform lightweight periodic sampling of the pending queries 112 to identify the wait states associated with each request, at the moment of sampling. This data, representing associations between queries processed by the database 108 and wait states experienced during the processing, can be used to identify problematic queries and, more specifically, the problematic portions of the queries.

The analysis component 116 may perform operations which comprise identifying which queries contributed to the anomalous load condition, analyzing potential root causes of the anomalous load condition, and identifying the most likely root causes.

The analysis component 116 may identify conditions that appear to be correlated to periods of anomalous operation. Here, correlation refers to identifying a relationship between a condition and one or more periods of anomalous operation. The condition, for example, might be observed as occurring just prior to or during the anomalous operating period, or during multiple such periods, with a frequency that suggests a causative relationship.

Analysis of the queries can, in embodiments, include a multifactor analysis which considers changes to the frequency with which a given query is executed, and changes to the manner in which the query is executed.

Analysis of the query can further involve, in embodiments, an analysis of wait event data. The analysis component 116, in at least one embodiment, identifies queries that contributed to the anomalous load condition by identifying those queries which dominate the sampling of wait events during the anomalous period. The analysis component 116 then further applies a rules-based approach to examine the dominating wait events and their relationships to the identified queries and system as a whole. The rules-based approach, in at least one embodiment, comprises testing a set of preformulated hypotheses to determine which hypotheses best match the accumulated data.

In at least one embodiment, a recommendation component 118 generates recommendations related to the identified queries, and portions thereof. The recommendations can be provided, via the client 110, to the owner of the database 108, and can provide a description of the anomalous load condition and suggestions regarding the tuning of the query language statements that were determined to be problematic. In at least one embodiment, the recommendations are drawn, at least partially, from the hypotheses tested by the analyzer component 116.

Figure 2:
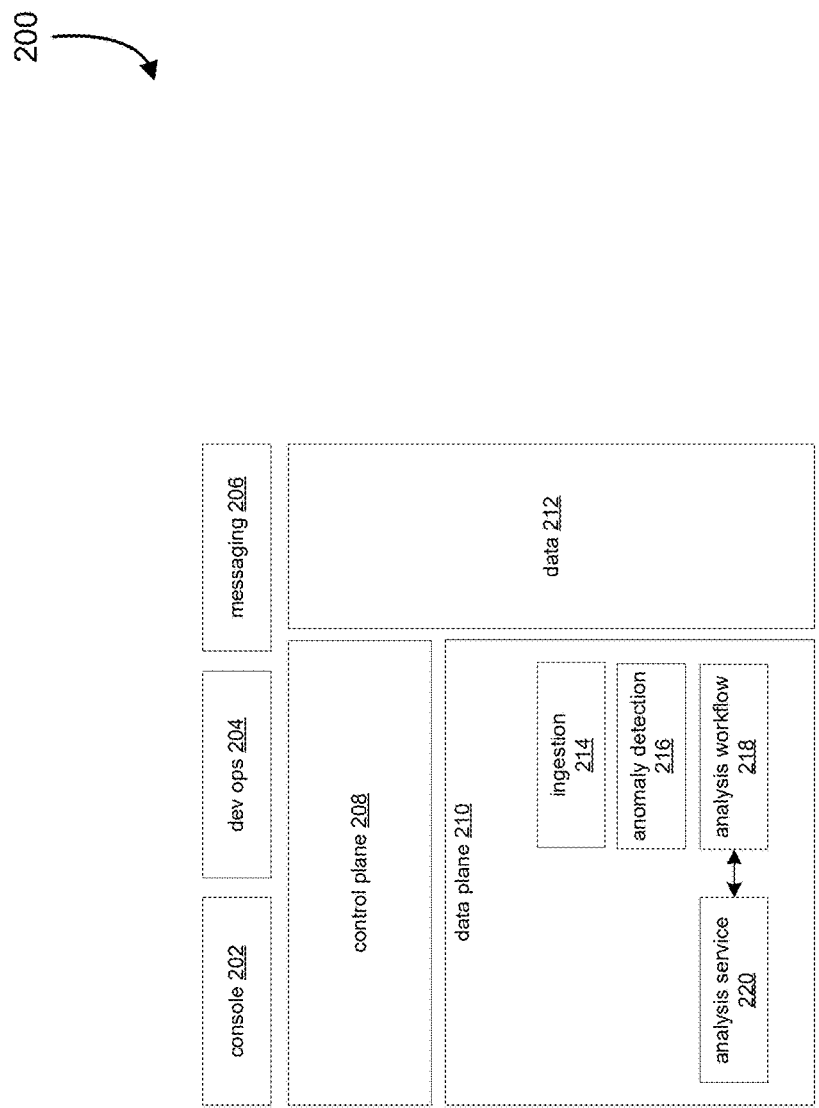
FIG. 2 illustrates an example system for detecting anomalous database load conditions are detected and generating recommendations for mitigation, in accordance with at least one embodiment.

FIG. 2 illustrates an example system 200 for detecting anomalous database load conditions are detected and generating recommendations for mitigation, in accordance with at least one embodiment. In at least one embodiment, the example system 200 comprises user interface components 202, 204, and 206 through which an owner of a hosted database system may perform basic administrative tasks related to the database, and a control plane 208, data plane 210, and data 212.

In at least one embodiment, the control plane 208 performs management functions and controls data flow between the hosted database server, the clients of the database, and the owner of the database. The data plane 210 implements functions and services related to the storage and retrieval of data, as well as functions related to detecting anomalous load conditions, analyzing root causes of the anomalous load conditions, and generating recommendations. Data for the system is maintained in one or more systems and services depicted in FIG. 2 as a data element 212. A variety of such systems and services can be employed, potentially including but not necessarily limited to relational data stores, file-based data stores, data lakes, data warehouses, and so on.

In at least one embodiment, the data plane 210 comprises an ingestion component 214 which obtains data on which to perform detection of anomalous load conditions and to generating recommendations for mitigating such conditions. The data ingested by the ingestion component 214 can include, but is not necessarily limited to, time series data indicating the number of pending queries, active sessions, and the like over a period of time, profiling data for the pending sessions (including wait state data), and so on.

In at least one embodiment, the data plane 210 comprises an anomaly detection component 216 to detect anomalous load conditions using embodiments of the various techniques described herein, including but not limited to embodiments described in relation to FIGS. 3-8.

In at least one embodiment, the data plane 210 comprises an analysis workflow component 218, to generate recommendations for mitigating an anomalous load condition. The analysis workflow component may generate these recommendations using embodiments of the various techniques described herein, including but not limited to those described in relation to FIGS. 3-8. The analysis workflow component 218 may, in some embodiments, utilize an analysis service 220. The analysis service 220 may provide various analytical capabilities, such as those related to performing anomaly detection, time series analysis, machine learning, and so forth.

Figure 3:
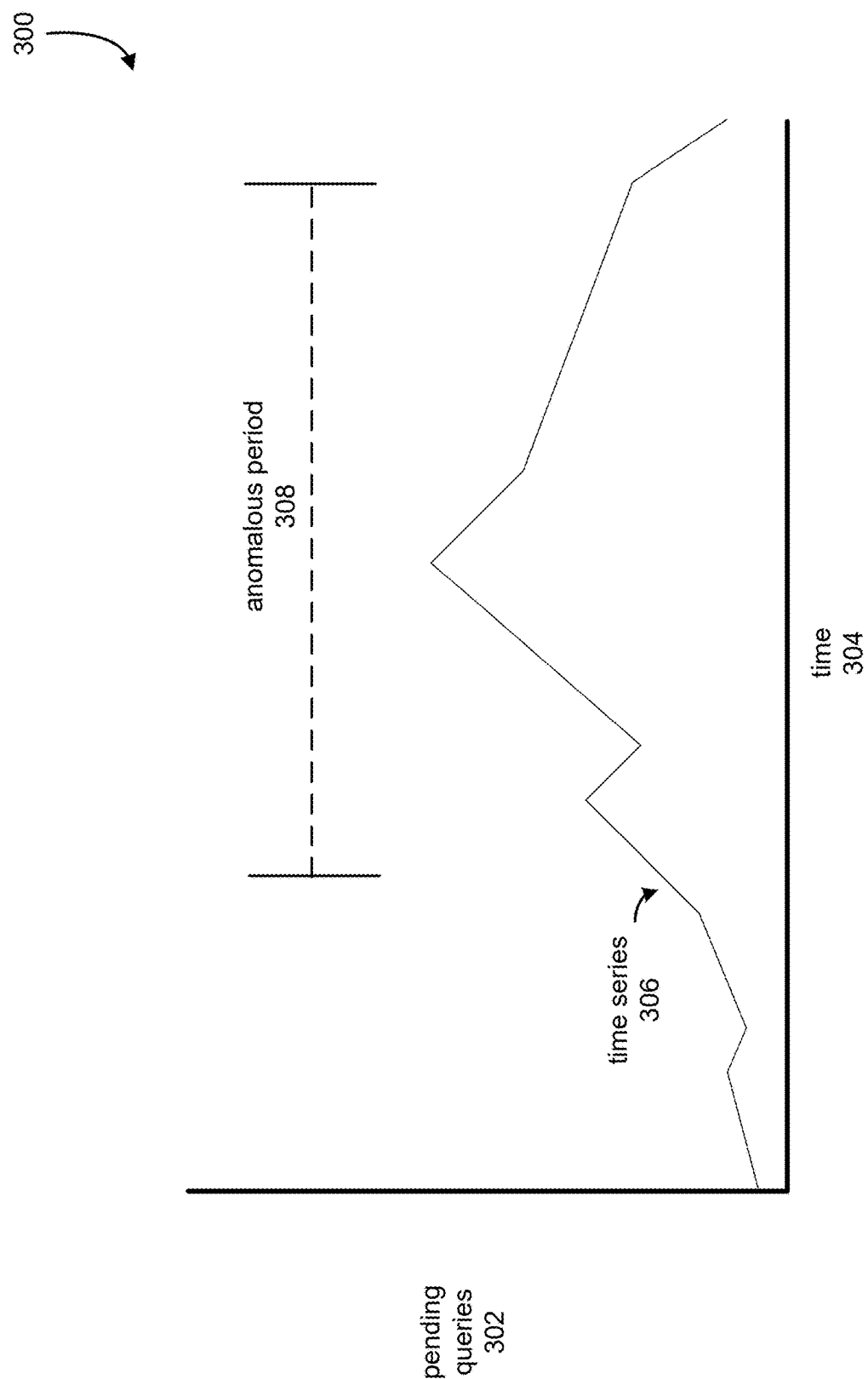
FIG. 3 illustrates an example of detecting an anomalous database load condition, in accordance with at least one embodiment.

FIG. 3 illustrates an example of detecting an anomalous database load condition, in accordance with at least one embodiment. As depicted in the example 300, a time series 306 of data can be used to store data representing pending database queries over time 304. In FIG. 3, pending database queries are depicted as being represented by pending queries 302, which corresponds to the number of database queries received by a database engine but not yet completely processed. In at least one embodiment, an active sessions metric is used to measure the number of pending queries, and can indicate the number of database queries being processed in parallel, and in some cases and embodiments may also indicate database queries that have been received by the database but whose execution has not yet begun. A variety of metrics may be used to represent the number of pending database queries, and that these metrics may be analyzed and used in a manner similar what is described in relation to FIG. 3.

As depicted in the example of FIG. 3, an anomalous period 308 may be represented in the time series 306. The anomalous period 308 can be seen in the example to include a period of relatively heavy load, as indicated by the peaks in the number of active sessions. Note that FIG. 3 depicts an example in which the peaks are relatively distinct, in order to provide a simple example for the purpose of illustrating aspects of potential embodiments. In practice, however, these time series can be complex and periods of heavy load can be difficult to discern and to demarcate. One reason is because periodic variation in demand may be normal. Another is that a level of database load that is problematic for some applications may not be problematic for others. To address these issues, a machine learning model is employed.

In at least one embodiment, a time series, such as the time series 306 depicted in FIG. 3, is analyzed to identify periods in which database load appears to be in excess of normal levels over a sustained period of time. The analysis is performed using a machine learning model which has been trained to distinguish normal periodic variations, sometimes referred to as seasonal variations, from unusual periods of database load. The machine learning model may further be trained to distinguish non-periodic but expected variations from those that may be considered anomalous or unexplained. For example, the machine learning model might be trained to correlate increases in database load to special events, such as product sales, even though these may not occur on any regular pattern. By being trained in such correlations, the machine learning model can distinguish between variations in database load that should be considered normal from those that should be considered anomalous, even when such normal variations occur on an irregular basis.

In at least one embodiment, a machine learning model is trained to identify patterns associated with anomalous database load. Examples of such patterns include periods of steadily increasing database load, step patterns in which database load increases and then drops suddenly, periods of sustained load, and so on. The machine learning model may use pending queries, active sessions, or other metrics that indicate database load for the purposes of identifying such patterns.

Figure 4:
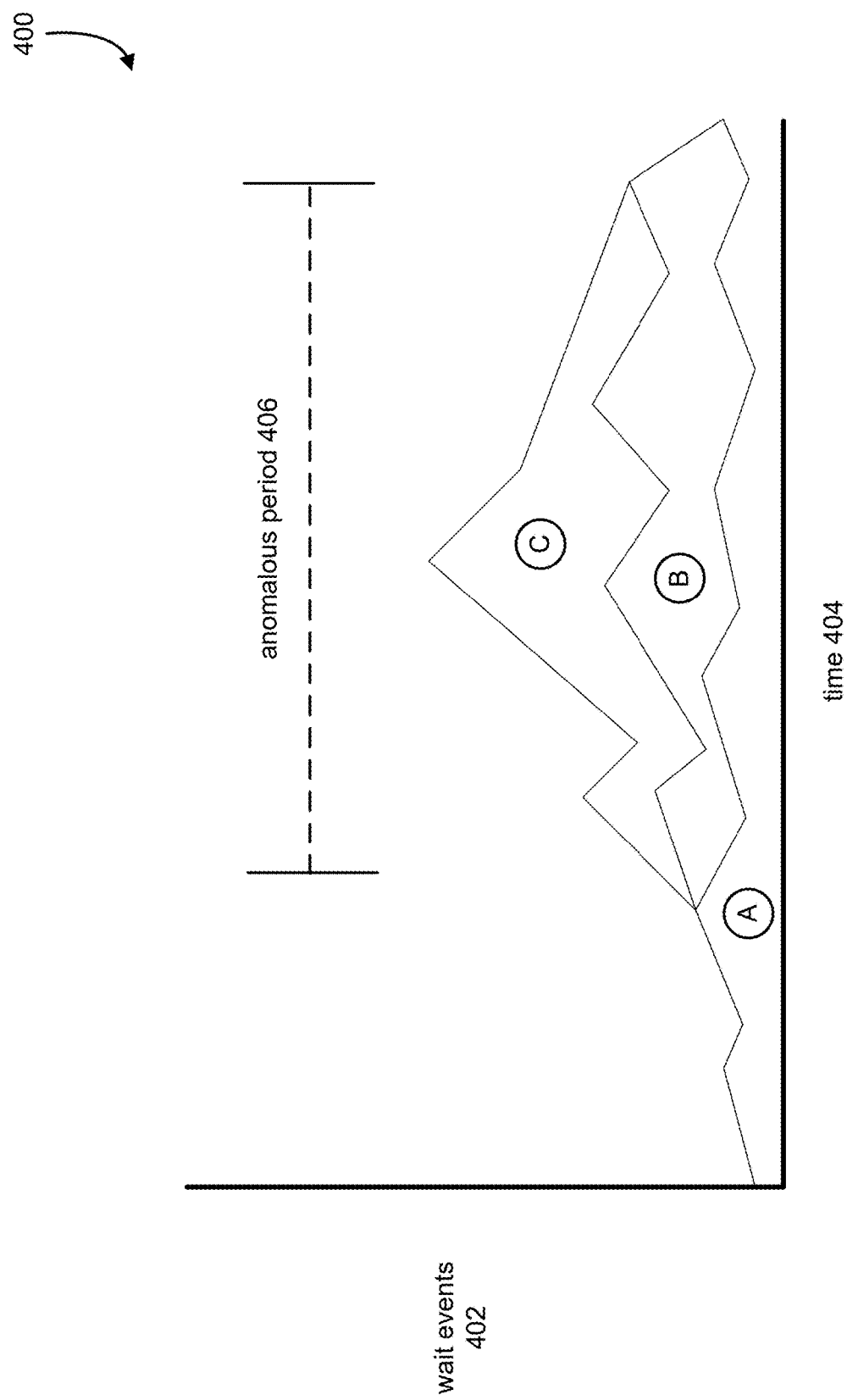
FIG. 4 illustrates an example of analyzing wait states and other conditions related to an anomalous database load condition, in accordance with at least one embodiment.

FIG. 4 illustrates an example of analyzing wait states related to an anomalous database load condition, in accordance with at least one embodiment. In at least one embodiment, lightweight sampling is performed on pending queries to identify and record information about their respective wait states. This information indicates what the underlying system was doing at the time of sampling, and over time can provide a reasonably accurate view of how the system is operating. In particular, it provides insight into what computing resources are being utilized to process the pending queries, and how much time the system spends waiting for these resources.

As depicted in the example 400 of FIG. 4, embodiments may analyze wait events 402 over time 404 to identify potential root causes of an anomalous period 406 of database load. The analysis can comprise identifying the respective proportions of various types of wait events. For example, as depicted in FIG. 4, three types of wait events "A," "B," and "C" may have been observed. Examples of such wait event types could include, but are not limited to, file reads, waiting on other threads to complete I/O, and waiting on CPU. It will be appreciated that these examples are intended to be illustrative, and should not be construed in a manner which would limit the scope of potential embodiments to only those that incorporate the specific examples provided. In general, the wait events may correspond to any condition that causes processing of a pending query to wait for a computing resource, including both waiting for a computing resource to become available, or waiting for a computing resource to complete a task assigned to it.

In at least one embodiment, the system obtains counts of the number of times a thread was observed being in a particular wait state. These values can be coalesced into time-ordered buckets, and arranged into time series in which each point of a time series indicates how much time was being spent, during a bucket of time, waiting for the corresponding resource. In the example 400, it can be seen that, over time, the respective percentages of time spent in wait states "A," "B," and "C" changed over time, particularly during the anomalous period 406. Time spend in wait state "A" remained relatively constant, but the time spend in states "B" and "C" increased significantly. The system may therefore identify and record that wait states "B" and "C" are potentially related to a root cause of the anomaly, based at least partially on the increased proportion of time spent in those wait states during the anomalous period 406.

Figure 5:
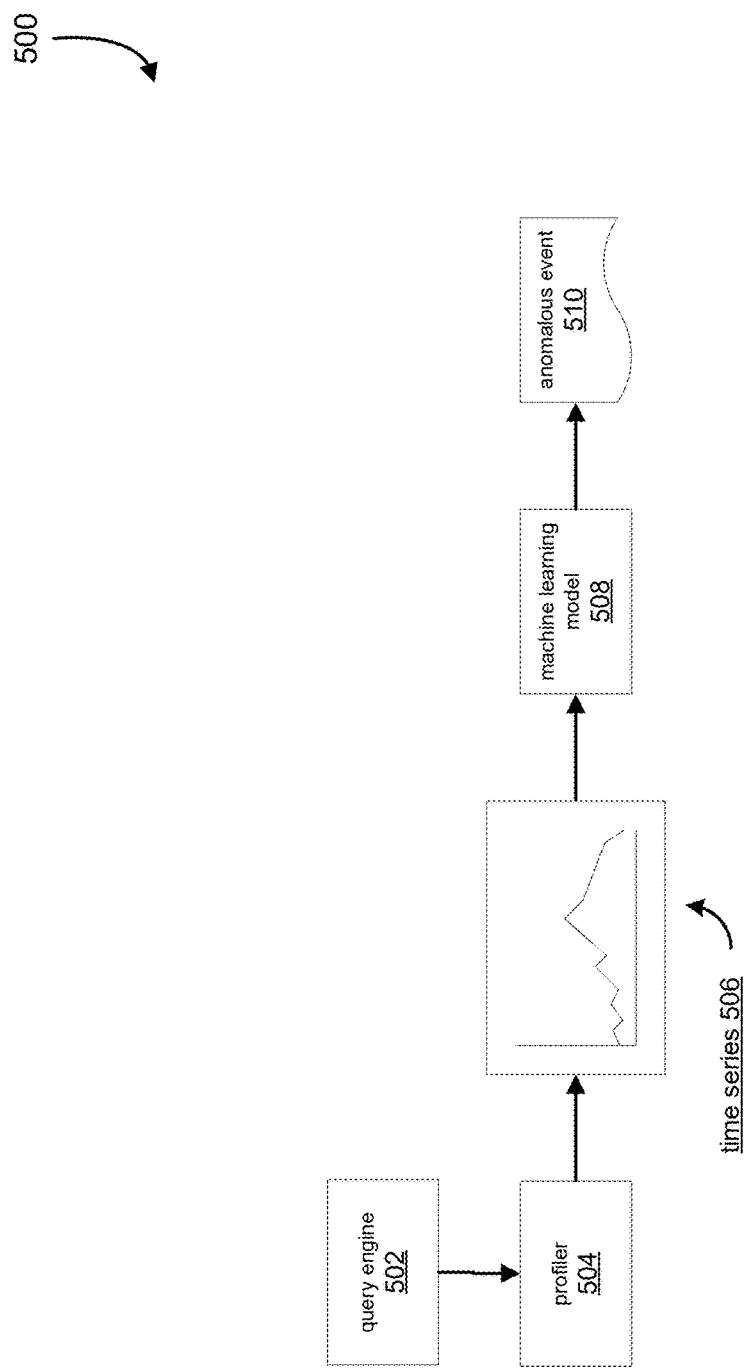
FIG. 5 illustrates an example process for generating hypotheses of root causes for an anomalous database load condition, in accordance with at least one embodiment.

FIG. 5 illustrates an example process for detecting an anomalous load condition in a database, in accordance with at least one embodiment. In the example 500, a system similar to those depicted in FIG. 1 or 2 identifies an anomalous database load condition by analyzing the number of pending database queries over time. In at least one embodiment, one or more query engines 502, sometimes referred to as database engines, of a database process received queries. Some number of the queries may be processed in parallel, and others may be received and queued until they can be processed. One or more profiler components 504 perform lightweight sampling on the query engines 502 and the pending queries, in order to count how many queries are pending and to record wait states observed in the pending queries.

Output of the profilers 504 can comprise a time series 506 which indicates the number of pending queries over time. Metrics that reflect the number of pending queries, including but not necessarily limited to the number of active sessions, may be preferable for detecting anomalous database load conditions because they can serve as good indicators of performance issues experienced by client applications of the database.

In at least one embodiment, a machine learning model 508 analyzes the time series 506 to identify periods in which the database load is anomalous. The machine learning model can comprise any of a variety of machine learning models, potentially including but not necessarily limited to convolutional neural networks, deep learning networks, recurrent neural networks, autoencoders, Markov chains, support vector machines, long/short term memory networks, decision forests, and so on. It will be appreciated that these examples are intended to be illustrative, and should not be construed in a manner which would limit the scope of potential embodiments to only those that incorporate the specific examples provided.

As depicted in the example 500, output of the machine learning model 508 can be an identification of an anomalous event 510, indicating an anomalous database load condition. In some cases and embodiments, this can include information demarcating the beginning and ending of an anomalous database load condition, or in some cases may constitute a binary classification of the database being in a state which corresponds to such an anomaly.

Figure 6:
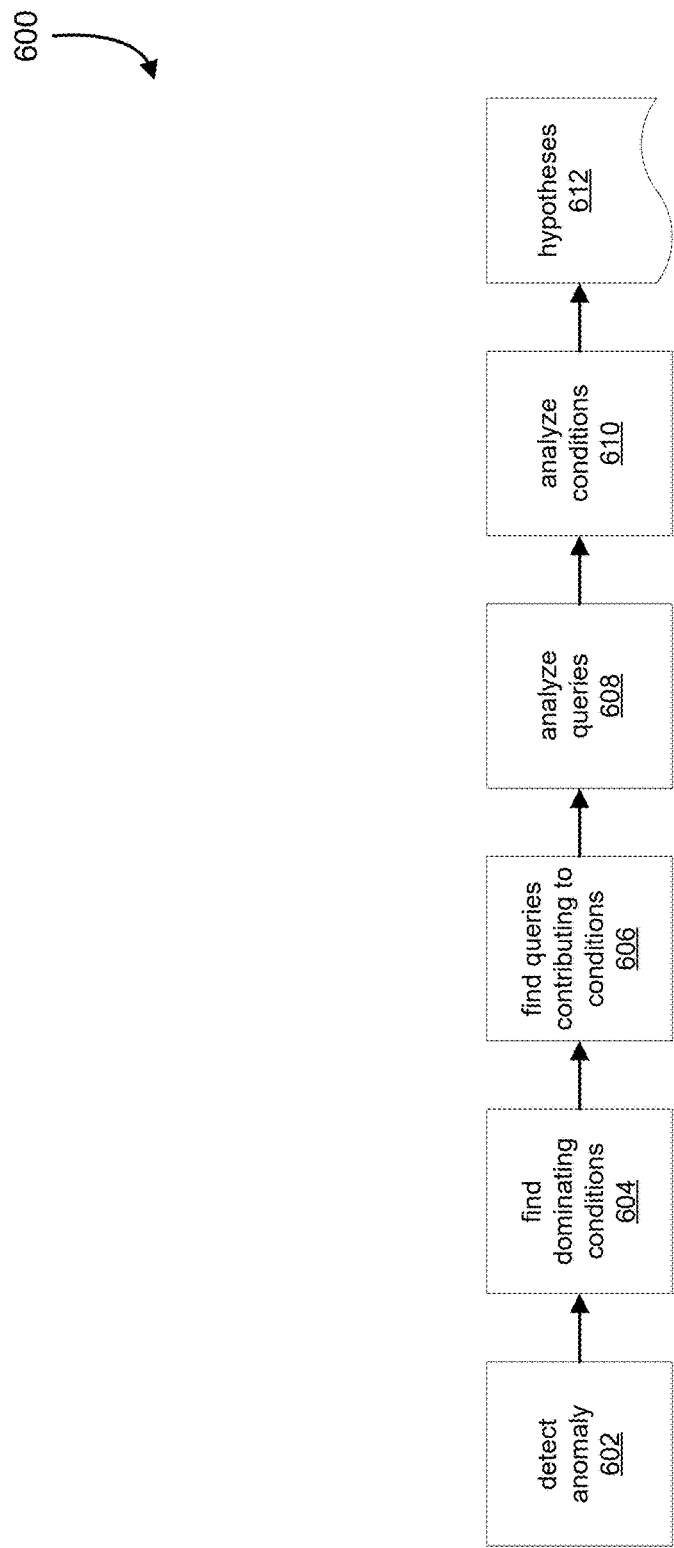
FIG. 6 illustrates an example process for detecting an anomalous load condition in a database, in accordance with at least one embodiment.

FIG. 6 illustrates an example process for generating hypotheses of root causes for an anomalous database load condition, in accordance with at least one embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

Figure 8:
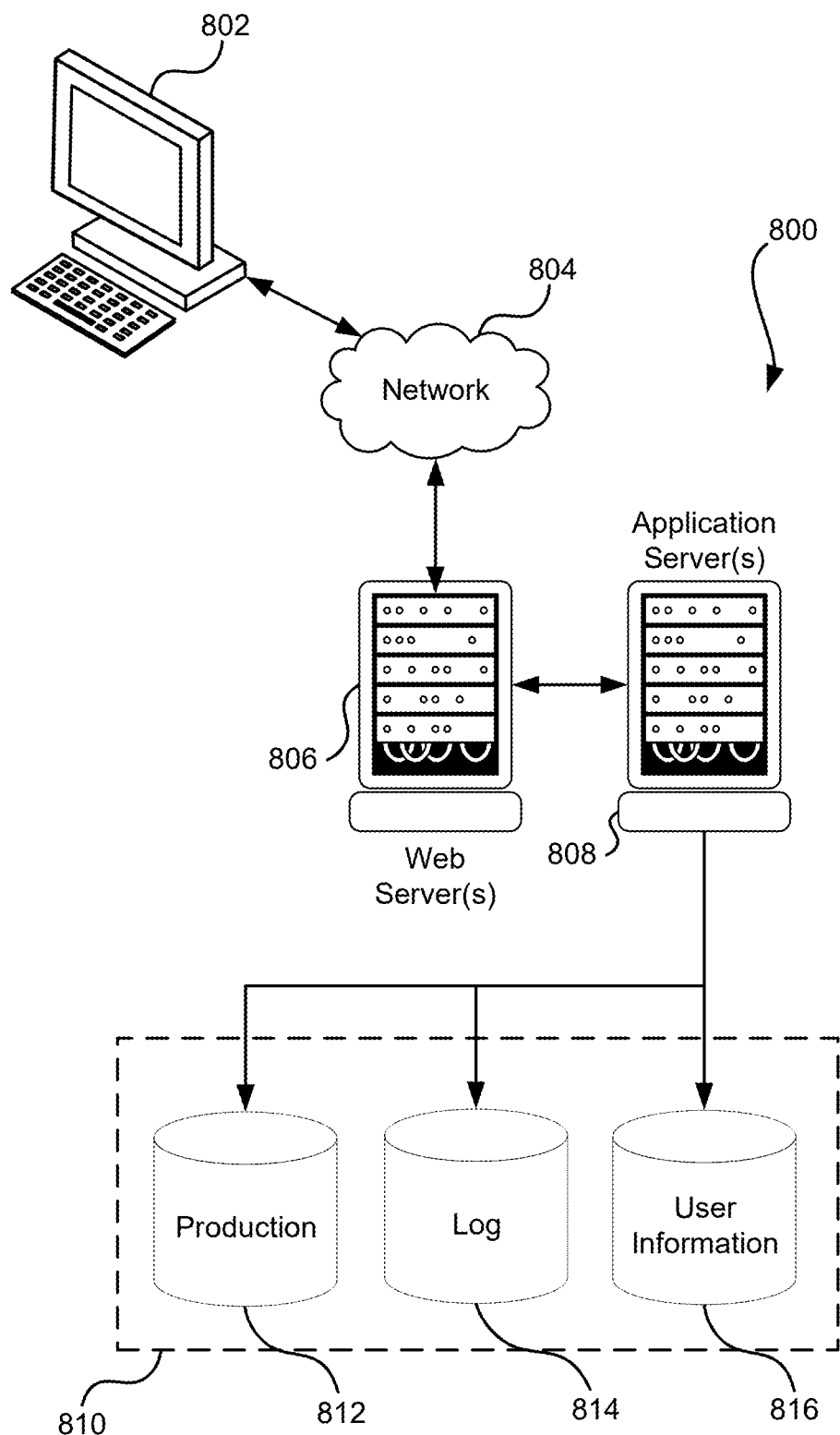
FIG. 8 illustrates a system in which various embodiments can be implemented.

In at least one embodiment, the steps or operations of FIG. 6 are implemented by embodiments of a system similar to those depicted in FIG. 1 or 2. These systems may be implemented by any suitable hardware or combination of hardware. In at least one embodiment, a distributed system such as the one depicted in FIG. 8 is used.

At 602, the system detects an anomalous load condition. This may be performed using any of the various embodiments described herein, including but not limited to those techniques described in relation to FIGS. 3-5.

At 604, the system finds dominating conditions. This can refer to the system collecting and recording information concerning the pending queries and the computing resources on which the queries depend, as is described, for example, in relation to FIG. 4, as well as other conditions related to the observed number of pending database queries. The system may identify, for each query, the computing resource on which the query is waiting, and record the information for later retrieval. The system may then aggregate the information such that it is able to identify, for a given period of time, the computing resources on which the queries were collectively waiting. For example, referring back to FIG. 4, the system might determine that wait events "B" and "C" are the dominate wait events. The system may similarly identify other conditions that appear to be potential explanatory facts regarding the observed number of wait events, such as the rate at which queries are being received, the wait at which queries are being executed, limitations in available resources such as memory or CPU, and so forth.

At 606, the system finds queries that contribute to the dominating conditions. These queries may be identified, in at least one embodiment, based on the number of wait events recorded for each query. The dominant queries will tend to be those with the greatest numbers of wait events. Similarly, for conditions other than wait events, the dominant queries may be those determined to have the most relevant connections to the dominant conditions. For example, particular queries might be received with higher frequency than others, or be particular to the time period identified as anomalous.

At 608, the system analyzes the queries identified at 606. In some cases and embodiments, this may comprise determining that the query as a whole is correlated to a period of anomalous activity. For example, the system may analyze the frequency with which a particular query was received before and/or during a period of anomalous database performance. In other cases and embodiments, analyzing a query comprises identifying elements of the query and determining, for the respective elements of a query, if the element is a likely contributor to one or more wait events. For example, the system may analyze the operations in a query's query plan and map these elements to the computing resources on which those elements depend. For example, table and index scans might be mapped to various input and output operations, and joins might be mapped to CPU resources.

At 610, the system analyzes the conditions. In at least one embodiment, this includes correlating the observed, dominant wait events or other conditions to the queries or elements of the queries. In this context, correlation refers to the condition appearing to have a relationship to the queries. In at least one embodiment, identifying correlations between observed conditions and the anomalous period of database operation allows the system to identify potential root causes of the anomalous period. For example, if the dominant wait event during an anomalous period is a sequential read event, queries whose elements require sequential reads may be considered candidates for association with the root cause, particularly those queries or elements which dominate the sampled wait times. The system may also identify related wait events, such as reads and writes to the same storage device.

At 612, the system tests hypotheses to information obtained in the prior analysis steps. In at least one embodiment, the system includes a set of rules, decision tree, expert system, or similar technology to examine data and conditions identified in the earlier steps. In at least one embodiment, this comprises testing conditional statements that, if satisfied, trigger either application of additional hypotheses, or the generation of a conclusion or statement that can be presented to the database owner.

An examples of hypothesis testing includes evaluating execution rate. In at least one embodiment, the system determines whether the current query execution rate is greater than or less than the historical average, by some threshold amount. In another example, the system tests to determine whether the execution rate is zero, or approximately zero.

In another example, the system tests a hypothesis related to frequency of a query. For example, the system might examine whether the frequency at which a particular query (e.g., a query with a particular SQL statement) is received. The system might determine whether the query is received relatively rarely, or never, except in association with the anomaly. Similarly, the system might determine that a query is received frequently, including at times not associated with the anomalous period.

In another example, the system tests correlations between database load, as measured by the number of pending queries or similar metrics, and other factors. These factors could potentially include, but are not limited to, execution rate of various queries. The correlation testing can determine if the correlation between the number of pending queries and another factor is high, low, or negative across the anomalous period, or across many anomalous periods.

Figure 7:
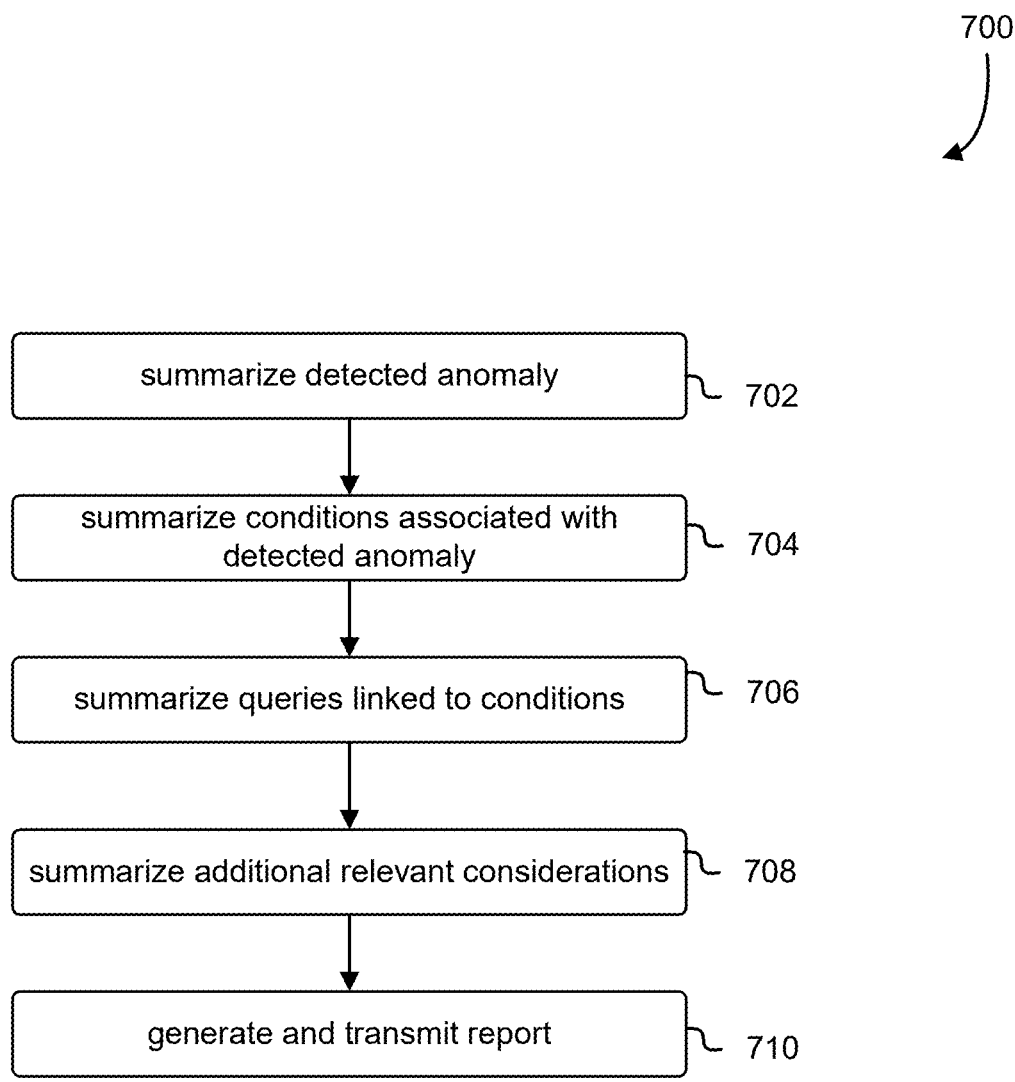
FIG. 7 illustrates an example process for generating recommendations for mitigating an anomalous database load condition, in accordance with at least one embodiment.

Hypotheses testing may be further understood in view of FIG. 7, which illustrates an example process for generating recommendations for mitigating an anomalous database load condition, in accordance with at least one embodiment. Although the example procedure 700 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the steps or operations of FIG. 7 are implemented by embodiments of a system similar to those depicted in FIG. 1 or 2. These systems may be implemented by any suitable hardware or combination of hardware. In at least one embodiment, a distributed system such as the one depicted in FIG. 8 is used.

At 702, the system summarizes the detected anomaly. The summarization can include information output from the machine learning model, which could for example include statistical information concerning the system's confidence that the time period in question represents an anomalous period. The system may further use hypotheses testing to highlight notable observations concerning the detection of the anomalous period. Output of the summarization, in at least one embodiment, comprises depiction or description of the anomaly, and related observations, in textual or graphical form.

At 704, the system summarizes relevant conditions associated with the detected anomaly. This can comprise generating depictions or descriptions of the various conditions, such as wait conditions, execution rates, query frequency, and so on that have been identified as significant, such as those that account for some proportion, above a threshold level, of the overall load on the system.

At 706, the system summarizes queries linked to the conditions. This can comprise generating depictions or descriptions of the queries that are identified as being most strongly linked to the most-observed conditions. In cases and embodiments, these may be the queries whose execution time is typically the longest or most resource-intensive.

In some embodiments, the system may summarize elements of the queries that contribute to the conditions. This can comprise generating depictions or descriptions of elements of the queries that the system identifies as likely to be linked to the observed conditions. In at least one embodiment, application of hypotheses is used to identify potential links. For example, the system might evaluate a hypotheses which tests for wait conditions related to CPU utilization and the prevalence of a query that performs join operations, and if these conditions are met, output summary information which highlights the join portion of the query and suggests that the database owner consider the impact this query might be having on overall performance of the database and its client applications.

At 708, the system summarizes any additional relevant considerations. This could include additional operational details, such as reporting on changes to the frequency with which certain queries are being executed, recent changes to database configuration or the quantity of data being managed, and so forth.

At 710, the system generates and transmits a report. The report might include any or all of the summarization information just described. The report may be transmitted, in embodiments, to the owner of a database, so that the owner might investigate and address the issues summarized in the report.

In at least one embodiment, the system generates a recommendation that comprises one or more details summarizing findings related to an observed condition, and recommendations for resolving a cause of the anomalous behavior. For example, the recommendation might indicate that a spike in the number of active sessions have been observed, describe the applicable time period, and describe that the percentage of sessions experiencing a particular type of wait event, during this period, is above some threshold level. The recommendation might further include a suggestion for the user to investigate why this event might be occurring.

In another example, the system generates a recommendation that identifies query commands, such as SQL statements, that appear correlated to one or more anomalous periods. In this example, the system might list the top N query commands, in terms of correlation, and suggest that the user conduct further investigation regarding these commands.

In another example, the system generates a recommendation that identifies changes to a query plan used to execute a SQL statement. The system may also indicate the degree to which the change to the query plan correlates to anomalous periods of operation.

In another example, the system generates a recommendation that includes an indication that the consumption or utilization of some resource, such as network bandwidth, disk I/O capacity, and so forth, is exceeding some threshold amount during periods of anomalous operation. The recommendation can include a description of the resource, and in some cases may also suggest potential causes of the resource over-utilization.

In another example, the system identifies changes to the configuration of the database, correlates any identified changes to periods of anomalous performance, and generates a recommendation that makes note of those changes which appear correlated.

The system may also, in some instances, indicate that particular user, account, or session appears to be dominating resource consumption during an anomalous period, and provide a suggestion to impose limitations on the resources available to that particular user, account, or session, a suggestion to conduct further analysis of the user, account, or session, or a suggestion to terminate access by the user, account, or session.

As one skilled in the art will appreciate in light of this disclosure, certain embodiments may be capable of achieving certain advantages, including identifying database performance problems that could not normally be detected, improving the operating efficiency of a database, and improving technical processes related to the identification and discovery of database performance issues.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The present disclosure may be further understood in view of the following clauses:

1. A system, comprising:
   at least one processor; and
   at least one memory comprising instructions that, in response to execution by the at least one processor, cause the system to at least:
   collect a time series of first data indicative of database queries being processed by a database system;
   collect second data indicative of conditions of the database system observed while processing the database queries;
   identify an anomalous period of operation of the database system based, at least in part, on analysis of the time series of first data by a machine learning model; and
   generate one or more recommendations for tuning performance of the database system based, at least in part, on evaluation of one or more hypotheses related to conditions observed during the anomalous period of operation.

2. The system of clause 1, the at least one memory comprising further instructions that, in response to execution by the at least one processor, cause the system to at least:
   obtain the time series of first data by periodically obtaining a count of a number of database queries being processed by the database system.

3. The system of clauses 1 or 2, the at least one memory comprising instructions that, in response to execution by the at least one processor, cause the system to at least:
   periodically obtain state information associated with at least one of the database queries, the state information indicative of a type of task being performed by a computing resource of the database system.

4. The system of any of clauses 1-3, wherein the conditions of the database system observed while processing the database queries comprises information indicative of time spent waiting on a computing resource to complete a task.

5. The system of any of clauses 1-4, wherein evaluation of the one or more hypotheses comprises identifying correlation between queries processed during the anomalous period of operation and conditions observed during the anomalous period of operation.

6. A method, comprising:
   obtaining a time series of first data indicative of database queries pending processing by a database system;
   obtaining second data indicative of conditions of the database system during processing of the database queries;
   identifying an anomalous period of operation of the database system based, at least in part, on analysis of the time series of first data; and
   generating one or more recommendations for tuning performance of the database system based, at least in part, on evaluating conditions of the database system during the anomalous period of operation.

7. The method of clause 6, further comprising:
   periodically sampling wait state information associated with one or more of the plurality of database queries.

8. The method of clauses 6 or 7, further comprising:
   determining a proportion of time spent waiting on a computing resource, relative to time spent waiting on other computing resources.

9. The method of any of clauses 6-8, further comprising:
   identifying correlation between queries processed during the anomalous period of operation and the conditions observed during the anomalous period of operation.

10. The method of any of clauses 6-9, further comprising:
  determining that evaluation of a query language command relies on a computing resource associated with the conditions of the database system during the anomalous period of operation.

11. The method of any of clauses 6-10, wherein the one or more recommendations comprise an indication of a query language command that is estimated to be a cause of the anomalous condition.

12. The method of any of clauses 6-11, wherein the anomalous condition is detected based, at least in part, on analysis of the anomalous condition by a machine learning model.

13. The method of any of clauses 6-12, further comprising:
  generating the one or more recommendations based, at least in part, on evaluation of one or more hypotheses associated with the conditions of the database system during the anomalous period of operation.

14. A non-transitory computer-readable storage medium storing thereon executable instructions that, as a result of being executed by one or more processors of a computer system, cause the computer system to at least:
  obtain a time series of first data comprising data points indicative of a number of database queries pending processing by a database system;
  obtain second data indicative of conditions of the database system while processing the database queries;
  identify an anomalous period of operation of the database system based, at least in part, on analysis of the time series of first data; and
  generate one or more recommendations to tune performance of the database system based, at least in part, on evaluation of conditions of the database system during the anomalous period of operation.

15. The non-transitory computer-readable storage medium of clause 14 wherein the instructions further comprise instructions that, as a result of being executed by the one or more processors, cause the computer system to:
  obtain the time series by periodically obtaining and recording a count of a number of database queries pending processing by the database system.

16. The non-transitory computer-readable storage medium of clauses 14 or 15, wherein the instructions further comprise instructions that, as a result of being executed by the one or more processors, cause the computer system to:
  periodically obtain information indicative of at least one of the pending database queries waiting for a computing resource to complete a task.

17. The non-transitory computer-readable storage medium of any of clauses 14-16, wherein the instructions further comprise instructions that, as a result of being executed by the one or more processors, cause the computer system to:
  identify a correlation between a query processed during the anomalous period of operation and a condition observed during the anomalous period of operation; and
  generate the one or more recommendations based, at least in part, on the correlation.

18. The non-transitory computer-readable storage medium of any of clauses 14-17, wherein the one or more recommendations comprise an indication of a query language command that is estimated to be a cause of the anomalous condition.

19. The non-transitory computer-readable storage medium of any of clauses 14-18, wherein the anomalous condition is detected based, at least in part, on analysis of the time series by a machine learning model.

20. The non-transitory computer-readable storage medium of any of clauses 14-19, wherein the instructions further comprise instructions that, as a result of being executed by the one or more processors, cause the computer system to:
  maintain a list of wait events encountered during evaluation of the database queries pending processing by a database system.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising instructions that, in response to execution by the at least one processor, cause the system to at least:
   receive a time series of first data indicative of one or more database queries processed by a database system;
   receive second data indicative of performance metrics associated with the database system during processing of the one or more database queries;
   cause a machine learning model to identify an anomalous period of operation of the database system, based at least in part on the first data; and
   generate one or more recommendations for tuning performance of the database system based, at least in part, on the performance metrics associated with the database system during the anomalous period of operation.

2. The system of claim 1, wherein the time series of first data comprises a count of a number of database queries processed by the database system.

3. The system of claim 1, the at least one memory comprising instructions that, in response to execution by the at least one processor, cause the system to at least:
   obtain state information associated with the one or more database queries, the state information indicative of a type of task performed by one or more computing resources of the database system.

4. The system of claim 1, wherein the performance metrics comprise information indicative of time spent waiting on one or more computing resources to complete a task.

5. The system of claim 1, wherein the machine learning model is used to identify a correlation between the one or more database queries and conditions observed during the anomalous period of operation.

6. The system of claim 1, wherein the one or more recommendations comprise one or more summaries of the anomalous period of operation.

7. A method, comprising:
   receiving a time series of first data indicative of one or more database queries processed by a database system;
   receiving second data indicative of performance metrics by the database system during processing of the one or more database queries;
   causing a machine learning model to identify an anomalous period of operation of the database system, based at least in part on the first data; and generating one or more recommendations for tuning performance of the database system based, at least in part, on the performance metrics of the database system during the anomalous period of operation.

8. The method of claim 7, further comprising:
determining based, at least in part, on the performance metrics, a proportion of time spent waiting on a first computing resource relative to time spent waiting on a second computing resource.

9. The method of claim 7, wherein the machine learning model is used to identify a correlation between the one or more database queries and conditions observed during the anomalous period of operation.

10. The method of claim 7, further comprising:
determining that evaluation of a query language command relies on one or more computing resources associated with conditions of the database system during the anomalous period of operation.

11. The method of claim 7, wherein the one or more recommendations comprise an indication of a query language command that is estimated to be a cause of an anomalous condition during the anomalous period of operation.

12. The method of claim 7, wherein the machine learning model is used to detect an anomalous condition during the anomalous period of operation based, at least in part, on analysis of the time series of first data.

13. The method of claim 7, further comprising:
generating the one or more recommendations based, at least in part, on anomalous conditions related to a spike in a number of active sessions, wait events, threshold levels, and query language commands, observed during the anomalous period of operation.

14. A non-transitory computer-readable storage medium storing thereon executable instructions that, as a result of being executed by one or more processors of a computer system, cause the computer system to at least:
collect a time series of first data comprising data points indicative of a number of pending database queries being processed by a database system;
collect second data indicative of performance metrics by the database system during processing of one or more database queries;
cause a machine learning model to identify an anomalous period of operation of the database system, based at least in part on the first data; and
generate one or more recommendations for tuning performance of the database system based, at least in part, on the performance metrics associated with the database system during the anomalous period of operation.

15. The non-transitory computer-readable storage medium of claim 14, wherein the time series of first data, periodically received and recorded, comprises a count of a number of database queries pending processing by the database system.

16. The non-transitory computer-readable storage medium of claim 14, wherein the performance metrics indicative of at least one or more of the pending database queries waiting for one or more computing resources to complete a task.

17. The non-transitory computer-readable storage medium of claim 14, wherein the instructions further comprise instructions that, as a result of being executed by the one or more processors, cause the computer system to:
use the machine learning model to identify a correlation between the one or more database queries and a condition observed during the anomalous period of operation; and
generate the one or more recommendations based, at least in part, on the correlation.

18. The non-transitory computer-readable storage medium of claim 14, wherein the one or more recommendations comprise an indication of a query language command that is estimated to be a cause of an anomalous condition during the anomalous period of operation.

19. The non-transitory computer-readable storage medium of claim 14, wherein the machine learning model is used to detect an anomalous condition during the anomalous period of operation based, at least in part, on analysis of the time series of first data.

20. The non-transitory computer-readable storage medium of claim 14, wherein the instructions further comprise instructions that, as a result of being executed by the one or more processors, cause the computer system to:
maintain a list of wait events encountered during analysis of the database queries pending processing by the database system during the anomalous period of operation.

* * * * *